United States Patent Office 3,024,243
Patented Mar. 6, 1962

3,024,243
NEW DERIVATIVES OF PYRROLOPYRIDINES AND PYRROLOQUINOLINES AND METHODS OF PREPARING THE SAME
John Song, Bridgewater Township, Somerset County, Robert L. Horton, Warren Township, Somerset County, and Paul T. MacGregor and Francis X. Markley, Piscataway Township, Middlesex County, N.J., assignors to American Cyanamid Company, New York, N.Y., a corporation of Maine
No Drawing. Filed Mar. 29, 1960, Ser. No. 18,249
16 Claims. (Cl. 260—295)

This invention relates to a new series of pyrrolopyridine and pyrroloquinoline compounds. More particularly, it relates to a new series of merimine derivatives and to methods of preparing the same.

In the chemical and patent literature various pyrrolopyridines have been described, such as, for example, in U.S. Patent 2,767,191. The compounds described in the latter patent have substituents in the 6- and 7-positions but only hydrogen in the 4-position. We have now found that pyrrolopyridines having particular substituents in the 4-position have pharmocological properties, for example anti-convulsant activity. They are also useful as intermediates in the preparation of the compounds described in U.S. Patent 2,767,191, as hereinafter shown in the examples.

The compounds of the present invention can be illustrated by the following general formula:

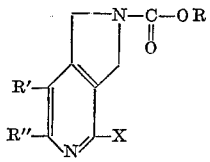

wherein R is lower alkyl or an aryl radical, R' is hydrogen, lower alkyl, halogen, aryl, nitro or an amino radical, R" is hydrogen, lower alkyl or an aryl radical and R' and R" when taken together form a trimethylene or tetramethylene radical, not more than one of R' and R" being hydrogen, and X is a monovalent radical of the group consisting of hydroxy, halogen and hydrazino radicals.

In general, the present compounds wherein X is hydroxyl are solids which are soluble in alcohol and relatively insoluble in ether. Their solubilities are relatively low in many of the common organic solvents.

The new pyrrolopyridines of the present invention containing no substituent or a lower alkyl, aryl or halogen substituent in the 7-position, as well as the pyrroloquinolines and compounds having five membered rings similar to the quinolines of the invention, are conveniently prepared by a reaction which involves a condensation of a 1-carbalkoxy-4-cyano-3-pyrrolidone (or the corresponding 4-carboxamide) with an alpha methylene carbonyl compound.

The condensation process involving the use of a 1-carbalkoxy-4-cyano-3-pyrrolidone (or the corresponding enol form) may be exemplified by the following equation:

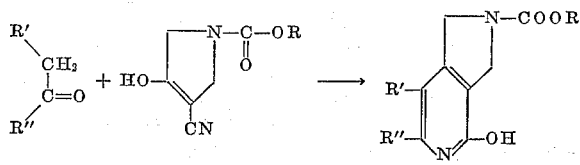

in which R, R' and R" are as hereinbefore defined. The hydrogen of the hydroxyl group in the 4-position may migrate to the nitrogen in the 5-position in the form of a keto-enol isomerization. The reaction between the cyano compound and the keto compound is conveniently carried out in a solvent such as, for example, polyphosphoric acid. In this reaction it may be seen that, depending on the course of the condensation, different isomeric products could be obtained, as for example, with methyl ethyl ketone, two products are possible: (1) ethyl 1,3-dihydro - 4 - hydroxy - 6,7 - dimethyl - 2H - pyrrolo - [3,4-c]pyridine-2-carboxylate or (2) ethyl 6-ethyl-1,3-dihydro-4 - hydroxy - 2H - pyrrolo[3,4-c]pyridine-2 - carboxylate. When the R" is methyl or a mono substituted methyl, the R' methylene group may appear in the 6-position and the R" group, less the alpha methylene, may appear in the 7-position. Thus, in the above case with methyl ethyl ketone, the main product which was isolated was shown by infrared and nuclear magnetic resonance spectra to be the 6,7-dimethyl compound. This was further confirmed by a "C-methyl" determination. Also, for example when chloroacetone is used, the chlorine in the main product isolated has been shown to be attached to the 7-position of the ring instead of to the 6-methyl group.

The process for condensation is usually carried out in polyphosphoric acid as the vehicle, using sufficient to give an easily stirrable mixture. Further details on the relative amount to be used are described hereinafter. The 1-carbalkoxy-4-cyano-3-pyrrolidones (hereafter referred to as the cyano pyrrolidone ester) may be used in anhydrous form, as the hydrate, or also as a sodio derivative. The corresponding 4-carboxamides may also be used. For best results, and to control the reaction more easily, the ketone is usually added portionwise to a heated mixture of the polyphosphoric acid and the cyano pyrrolidone ester, and the mixture is heated until reaction is complete. In practice, one-third of the ketone may be added at one time, heating the batch in the intervals to complete the reaction. After completion, the mixture is drowned in water and the product is isolated by conventional means such as filtration or by extraction with an organic solvent such as chloroform with subsequent removal of the solvent from the extract and isolation of the product.

Ordinary commercial polyphosphoric acid may be used; however, in some instances it is desirable to add additional phosphorus pentoxide, especially for the acetone condensations. However, in the case of chloroacetone, addition of phosphorus pentoxide resulted in lower yields and greater decomposition as evidenced by extreme discoloration. In some instances, water and alcohol may be used as diluents for the polyphosphoric acid with varying results. A practical amount of polyphosphoric acid to be used is about 100 parts of polyphosphoric acid for about 20 parts of cyano pyrrolidone ester, although this may be varied up to about 220 parts PPA/20 parts cyanopyrrolidone. Stoichiometric amounts of ketone in relation to the cyano derivative give satisfactory results, but in practice, approximately a 10% excess of ketone is useful. In the case of acetone, more acetone is desirable.

The 4-hydroxy products obtained in these condensations have very high melting and decomposition points, mostly above about 250° C., and the actual melting point and decomposition point are, therefore, not of great significance. The products can be analyzed by elementary analysis, and the structure can also be confirmed by examination of the infrared, nuclear magnetic and ultraviolet spectra.

For the preparation of 7-nitro derivatives, direct nitration of the corresponding product with no substituent in the 7-position is convenient. The corresponding 7-amino derivatives may be obtained from the 7-nitro derivatives by conventional reduction methods. The 7-chloro derivatives may be prepared by direct chlorination of the corresponding 4-hydroxy products with no substituent in the 7-position; or furthermore, the 7-chloro derivatives may be obtained from the corresponding 7-amino derivatives by diazotization and replacement with chlorine.

The 4-hydroxy compounds of the invention undergo a wide range of chemical conversion reactions. Thus, for example, reaction with phosphorus pentachloride results in replacement of hydroxyl in the 4-position by chlorine. The 4-chloro compounds may be reacted with various reagents such as hydrazine, etc., or the 4-chloro substituent may be removed by conventional reduction means. The 2-carbalkoxy group is removable by an acid hydrolysis method.

The invention is further illustrated by the detailed examples hereinafter which describe the preparation of representative compounds of the present invention.

EXAMPLE I

*Preparation of Ethyl 1,3-Dihydro-4-Hydroxy-6-Methyl-2H-Pyrrolo[3,4-c]Pyridine-2-Carboxylate*

To a mixture of 500 parts of polyphosphoric acid (PPA) and 50 parts of phosphorus pentoxide is added 40 parts of 1-carbethoxy-4-cyano-3-pyrrolidone monohydrate. After stirring to form a dispersion, there is added dropwise 15 parts of acetone. The reaction mixture is then heated for a short period at 95° to 100° C. (1 hour), and an additional 15 parts of acetone is added dropwise at this temperature. After further stirring at this temperature (1 hour), a third portion of 15 parts of acetone is added. After stirring an additional period (1 hour) at 95° to 100° C., the hot reaction mixture is drowned in water, keeping the temperature of the drowning mixture below 25° C. After stirring at room temperature and clarifying the drowning solution with activated charcoal, the product is removed by extraction with chloroform. After concentration of the chloroform solution to a small volume and dilution with twelve volumes of petroleum ether, the product is obtained by filtration at room temperature giving 14.7 parts of crude product (33.2%).

The crude product may be purified by recrystallization from anhydrous alcohol to give a purified product which decomposes at about 265° to 270° C. with continuous darkening and final carbonization without melting.

Other experiments similar to the one above are carried out by using different temperatures, etc. Substantial yields are obtained at temperatures of 100° C. and 130° C. At 66° C. or by adding the pyrrolidone derivative in acetone solution, poor yields are obtained.

EXAMPLE II

*Preparation of Ethyl 7-Chloro-1,3-Dihydro-4-Hydroxy-6-Methyl-2H-Pyrrolo[3,4-c]Pyridine-2-Carboxylate*

To a mixture of 200 parts of polyphosphoric acid and 40 parts of 1-carbethoxy-4-cyano-3-pyrrolidinone monohydrate is added, with stirring, 7 parts of chloroacetone. The mixture is stirred at 90° to 95° C. for 3 hours, and at the end of the first and second hours, additional 7-part portions of chloroacetone are added. The mixture is then cooled to about 30° C. and 900 parts of water at about 15° C. is added rapidly. The whole mixture is stirred while keeping the temperature below about 30° C. The solid product which forms is isolated by filtration, washed with water and dried. After slurrying in anhydrous alcohol and drying, it is further purified by recrystallization from boiling acetic acid, giving 19.9 parts of product (38.9% yield).

Further experiments similar to the one above are carried out where variations in time, concentrations, heating period, etc., are studied, including use of the pyrrolidone hydrate, the sodium salt and the anhydrous pyrrolidone derivative.

EXAMPLE III

Using procedures similar to those described in Examples I and II, condensations with various keto derivatives are carried out. In the following table are shown the results of such experiments indicating the products formed.

*Table I.—Condensation of 1-Carbethoxy-4-Cyano-3-Pyrrolidone With Various Ketones to Form Substituted Ethyl 1,3-Dihydro-4-Hydroxy-2H-Pyrrolo[3,4-c]Pyridine-2-Carboxylates*

| Ketone used [1] | Grams of polyphosphoric acid | Moles of cyano-pyrrolidone-ester | Moles of ketone | Yield, percent | Product substituent and position (all 4-hydroxy-derivs.) | Remarks |
|---|---|---|---|---|---|---|
| Acetone | [2] 500 | 0.2 | 6.659 | 33 (crude) 22 | 6-methyl | [3]. |
| Chloroacetone | 200 | 0.2 | 0.227 | 38.9 | 6-methyl-7-chloro | |
| Butanone-2 | 200 | 0.1 | 0.166 | 96.9 crude, 76.3 recryst. | 6,7-dimethyl | [4]. |
| Pentanone-3 | 100 | 0.05 | 0.059 | 17 | 6-ethyl-7-methyl | [5]. |
| Octanone-2 | 100 | 0.075 | 0.078 | 30 | 6-methyl-7-n-pentyl | |
| Acetophenone | 100 | 0.05 | 0.054 | 6 | 6-phenyl | |
| p-Methoxyacetophenone | 100 | 0.05 | 0.055 | 15 | 6-(4-methoxy-phenyl) | |
| β-acetonaphthone | 200 | 0.02 | 0.220 | | 6-(2-naphthyl) | |
| Phenylacetone | 100 | 0.05 | 0.052 | 8.7 | 6-methyl-7-phenyl | |
| Cyclopentanone | 100 | 0.05 | 0.059 | 52 crude, 36 recryst. | 6,7-trimethylene [6] | |
| Cyclohexanone | 100 | 0.05 | 0.051 | 43 | 6,7-tetra methylene [6] | [7]. |
| 2-cyclohexenone | 100 | 0.05 | 0.094 | | 6,7—CH=CH—CH$_2$—CH$_2$ [8]. | |

[1] Heating period varied from 2 to about 3 hours.
[2] 50 g. of P$_2$O$_5$ added.
[3] Product isolated by CHCl$_3$ extraction.
[4] Various other modified runs were carried out.
[5] Cyclopenta-pyridine derivative.
[6] Ethyl 1,3,6,7,8,9-hexahydro-4-hydroxy-2H-pyrrolo(3,4-c)quinoline-2-carboxylate.
[7] Various modifications of process were carried out.
[8] See footnote 5 above, corresponding 1,3,8,9-tetrahydro derivative.

EXAMPLE IV

*Preparation of Ethyl 1,3-Dihydro-4-Hydroxy-6-Methyl-7-Nitro-2H-Pyrrolo[3,4-c]Pyridine-2-Carboxylate*

To 90 parts of 98% sulfuric acid is added 4 parts of the product of Example I. During the addition the temperature rises somewhat and after stirring until the temperature falls to 33° C., 2.4 parts (by volume) of 96% fuming nitric acid is added in dropwise fashion. The temperature rises rapidly to about 45° C. and is held at that temperature by ice bath cooling until completion of the addition of the nitric acid. After stirring the mixture for about 45 minutes at 45° to 47° C., it is drowned in a mixture of 500 parts of ice and water. After saturating with sodium sulfate at 20° C., the precipitated product is removed by filtration and washed with cold water. This may be recrystallized from water to give purified material with a melting point at 265° C., decomposition starting at 251° C. and the product turning black by 263° C.; at 265° C. the solid suddenly decomposes with melting and gas evolution.

The product may be purified by dissolving it in warm chloroform, adjusting to a small volume and diluting with about 10 volumes of petroleum ether, and by recrystallization from anhydrous alcohol. The product when subjected to melting point determination shows decomposition starting at 225° C. and the product is completely decomposed without melting at 255° C.

EXAMPLE V

*Preparation of Ethyl 7-Amino-1,3-Dihydro-4-Hydroxy-6-Methyl-2H-Pyrrolo[3,4-c]Pyridine-2-Carboxylate*

A slurry of 0.4 part of the 7-nitro compound, prepared in Example IV, in 16 parts of concentrated hydrochloric acid is prepared. To this slurry at room temperature is added 1.5 parts of anhydrous stannous chloride. The reaction mixture is warmed at 48° to 50° C. (15 minutes) and is then evaporated to dryness (room temperature) giving a yellow residue. This is dissolved in water and the aqueous solution is made alkaline with ammonium hydroxide, causing formation of a precipitate containing the product and tin hydroxide. After filtration the solids are extracted with chloroform which removes the product. Evaporation of the chloroform leaves the product in solid form. This residue is crystallized from anhydrous alcohol, giving the 7-amino compound. Analysis on this product corresponds with the theoretical value for the compound named above.

When experiments are carried out on a similar reduction of the 7-nitro derivative to the corresponding 7-amino derivative by a catalytic hydrogenation over platinum oxide in glacial acetic acid, the 7-amino product in 46.3% yield is obtained.

EXAMPLE VI

*Preparation of Ethyl 7-Chloro-1,3-Dihydro-4-Hydroxy-6-Methyl-2H-Pyrrolo[3,4-c]Pyridine-2-Carboxylate*

To a mixture of 0.6 part of the 7-amino-6-methyl-4-hydroxy derivative (product of Example V) in 5.2 parts of water and 32 parts of concentrated hydrochloric acid is added 0.442 part of cupric chloride dihydrate. After stirring and cooling the mixture to about −12° to −10° C., a solution of 0.23 part of sodium nitrite in 2 parts of water is added gradually beneath the surface. After standing for an additional period at room temperature (18 hours), the reaction solution is heated to 95° C. (2 hours) and then clarified with activated charcoal. Partial neutralization of the filtrate with concentrated ammonium hydroxide (to a pH of about 2) causes the product to precipitate. Isolation of filtration and washing with water gives 0.188 part of product (28.9% of theory). The product is purified by recrystallization from acetic acid.

EXAMPLE VII

*Preparation of Ethyl 7-Chloro-1,3-Dihydro-4-Hydroxy-6-Methyl-2H-Pyrrolo[3,4-c]Pyridine-2-Carboxylate*

A 6.7 portion of the product of Example I is reacted with 2.6 parts of chlorine in 275 parts of glacial acetic acid at room temperature. After drowning the reaction mixture in water and cooling, the product is isolated by filtration, giving 4.4 parts of material. This may be purified by recrystallization from dilute acetic acid, giving 3 parts of the 7-chloro-6-methyl-4-hydroxy derivative which decomposes at about 281° to 282° C.

EXAMPLE VIII

*Preparation of Ethyl 4-Chloro-1,3-Dihydro-6-Methyl-7-Nitro-2H-Pyrrolo[3,4-c]Pyridine-2-Carboxylate*

A mixture of 200 parts of $POCl_3$, 8.8 parts of phosphorus pentachloride and 8 parts of the 4-hydroxy-6-methyl-7-nitro compound (Example IV) is heated gradually to about 92° C. and then held at a temperature of 90° to 95° C. until reaction is complete (15 minutes). After cooling to room temperature, the mixture is drowned in ice and water, keeping the temperature below about 20° C. After clarifying the solution with activated charcoal, the product is extracted using chloroform. Concentration of the chloroform filtrate to a small volume and dilution with about 10 volumes of petroleum ether causes precipitation of impurities which are removed by clarification. Further concentration results in formation of a crystalline product in the amount of 5.8 parts (68.2% theory).

EXAMPLE IX

*Preparation of Ethyl 7-Amino-4-Chloro-1,3-Dihydro-2H-Pyrrolo[3,4-c]Pyridine-2-Carboxylate*

To a slurry of 0.5 part of the chloro-nitro compound (Example VIII) 5 parts of water and 5 parts of concentrated hydrochloric acid is added 3 parts of anhydrous stannous chloride. The reaction is exothermic and the temperature rises rapidly to about 42° C. The starting material dissolves and the new product precipitates. After cooling to 0° C., the solid product is removed by filtration and crystallized from a chloroform-petroleum ether mixture. It may be further purified by recrystallization from ethanol, giving a product with a melting point of 210° to 214° C. with decomposition. The final purified product weighs 0.25 part 52.1% of theory. Analysis of this product correspondes with the theoretical values for the above product.

EXAMPLE X

*Preparation of Ethyl 4,7-Dichloro-1,3-Dihydro-6-Methyl-2H-Pyrrolo[3,4-c]Pyridine-2-Carboxylate*

To a stirred mixture of 20 parts of 4-hydroxy-7-chloro compound (Example VII) and 130 parts of o-dichlorobenzene at 110° to 112° C. is added gradually dropwise a solution of 16.4 parts of phosphorus pentachloride in about 120 parts of o-dichlorobenzene. A clear solution is formed and heating is continued until the evolution of hydrogen chloride ceases. Solvent is then removed by distillation under reduced pressure, leaving a residue which crystallizes to a solid mass. Product is extracted from this mass using hot methanol. Cooling of the methanol solution gives the product a crystalline form which is isolated by filtration, giving 13.5 parts of product (63%). Further product in the amount of 4.9 parts (23%) may be obtained from the methanol mother liquor.

In another preparation, a product which is recrystallized twice from methanol has a melting point of 139° to 142° C. Analysis of this product approximates the theoretical values for the desired compound.

EXAMPLE XI

*Preparation of Ethyl 7-Amino-1,3-Dihydro-6-Methyl-2H-Pyrrolo[3,4-c]Pyridine-2-Carboxylate*

A. 0.372 part sample of the 4-chloro-6-methyl-7-nitro compound is dissolved in 60 parts of methanol and added to a suspension of 0.05 part of 10% palladium on charcoal in about 30 parts of methanol. The reduction is carried out with hydrogen (1 atmosphere pressure at 20° C.). The catalyst is removed by filtration and the filtrate is made alkaline with 10% sodium hydroxide solution. The product which separates is removed by filtration and dried, giving 0.260 part of product (90% recovery). For purification this is recrystallized from aqueous methanol, giving the 7-amino-6-methyl compound having a melting point of 178° to 182° C. Recrystallization gives 0.200 part of material with a melting point of 178° to 182° C., undepressed when mixed with an authentic specimen of melting point 182° to 183° C. The infrared spectra of the synthetic and authentic samples are identical after each sample has been taken up in chloroform and the solvent evaporated.

EXAMPLE XII

*Preparation of Ethyl 1,3-Dihydro-6,7-Dimethyl-2H-Pyrrolo[3,4-c]Pyridine-2-Carboxylate, Hydrochloride*

To a slurry of 5 parts of 10% palladium on carbon in 20 parts of water is added 44.3 parts of the 4-chloro-6,7-dimethyl derivative and 200 parts of methanol. This mixture is placed in a hydrogenation apparatus and reduced at about 18° C. (elapsed time 2 hours 10 minutes) by a conventional hydrogenation procedure. After completion, the catalyst is removed by filtration and the filtrate is evaporated to dryness, leaving a crude product weighing about 42.1 parts (94.3% of theory). The product is purified by recrystallization from methanol. Recrystallization from methanol gives 25.5 g. of product (57.2% of theory recovered). Additional material can be obtained from the mother liquor but is of a lower quality. (The product may also be called 2-carbethoxy-6,7-dimethyl merimine hydrochloride).

EXAMPLE XIII

*Preparation of 1,3-Dihydro-6,7-Dimethyl-2H-Pyrrolo-[3,4-c]Pyridine Dihydrochloride*

A mixture of 15 parts of acetic acid, 1 part of water and 90 parts of sulfuric acid is cooled to 25° C. and to it is added 5 parts of 2-carbethoxy-6,7-dimethyl merimine hydrochloride. The solution is heated with stirring at 120° to 130° C. until the reaction is complete (about 2 hours). The mixture is then cooled to 25° C. and then slowly drowned in 210 parts by volume of 45% aqueous ammonium hydroxide solution, keeping the temperature below about 25° C. The drowning solution is made alkaline to phenolphthalein indicator paper. It is then extracted with chloroform in 4 portions and the chloroform extract, after drying, is evaporated leaving a residue in the form of a yellow solid (2.7 parts, 94% of theory). This crude base is dissolved in about 35 parts of anhydrous alcohol, clarified with activated charcoal and then mixed with about 16 parts of ethanol saturated with hydrogen chloride. The dihydrochloride which forms as a precipitate is removed by filtration, washed with anhydrous alcohol and dried, giving 3.2 parts of product (74% of theory overall). For further purification the dihydrochloride may be recrystallized from methanol.

Recrystallization of the crude dihydrochloride from 96 parts of methanol gives 1.5 g. (36%) of white crystalline material which on analysis agrees closely with the theoretical values for the desired compound.

EXAMPLE XIV

*Preparation of Ethyl 7-Chloro-4-Hydrazino-1,3-Dihydro-6-Methyl-2H-Pyrrolo[3,4-c]Pyridine-2-Carboxylate*

A mixture of 8.5 parts of the 4,7-dichloro-6-methyl compound, 85 parts of n-butanol and about 17 parts of 100% hydrazine hydrate is heated at the reflux temperature (106° to 110° C.) until the reaction is complete (about 16 hours). Initially all the solid product dissolves at about 100° C. and after the reaction is complete, a new solid product forms in the mixture, which, after the reaction is complete, is cooled to 0° C. The solid product is removed by filtration and after thorough washing with butanol and methanol is dried, giving 6.6 parts of the hydrazino product. For purification this is triturated with water and after filtering and drying a product is obtained with a melting point of 239° to 242° C. with decomposition. The product may be further purified by reprecipitation from acid solution by the addition of base.

A 1 g. sample of the crude is dissolved in 157 ml. of water containing 2 ml. of concentrated hydrochloric acid. After clarifying with activated charcoal the solution is made alkaline with ammonia. The product which precipitates, after filtration, washing and drying, gives 0.784 g. of solid (78.4% recovery) with a melting point of 220° to 224° C. with decomposition. The wave length of maximum absorption in methanol is 250 mu with an extinction coefficient (ε) of 11,500. A sample of the material recrystallized from n-butanol gives analytical results close to the theoretical values for the desired compound.

EXAMPLE XV

*Preparation of Ethyl 4-Hydrazino-1,3-Dihydro-6-Methyl-7-Nitro-2H-Pyrrolo[3,4-c]Pyridine-2-Carboxylate*

To a solution of 0.503 part of 4-chloro-6-methyl-7-nitro compound in 16 parts of anhydrous ethanol is added 5 parts of an alcohol solution containing 100% hydrazine hydrate in a concentration of 1.7 parts of 100% hydrazine hydrate in about 50 parts. After mixing, the solution acquires a deep red color and after standing at room temperature, a solid product forms. This is removed by filtration, washed with water and dried, giving 0.308 part of crude material (62.3%). The product is purified by several recrystallizations from anhydrous ethanol, giving a product which melts with decomposition at 193° to 213° C. inserted in the bath at 80° C., and at 213° to 223° C. if inserted at 175° C. The product is recrystallized three times from alcohol. Analytical results are close to theoretical values. Wave length of maximum absorption in methanol solution is 360 mu. Extinction coefficient (ε) is 11,500.

EXAMPLE XVI

*Preparation of Ethyl 7-Chloro-1,3-Dihydro-6-Methyl-2H-Pyrrolo[3,4-c]Pyridine-2-Carboxylate*

To 0.5 part of the 4-hydrazino compound of Example XV is added 0.929 part of cupric sulfate in 10 parts of water. The mixture is heated at 90 to 95° C. (20 minutes). The mixture is filtered hot to remove the metallic copper precipitate and the clear filtrate is then added to a mixture of 10 parts of water and 5 parts of concentrated ammonium hydroxide solution. The solid product which forms is removed by filtration, and recrystallized from 50% aqueous ethanol, giving 0.245 part product (55.2% of theory) having a melting point of 96.3° to 98.1° C.

We claim:
1. A compound of the formula:

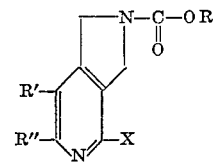

water. The mixture is heated at 90° to 95° C. (20 minalkyl and monocyclic aryl, R' is a member of the group consisting of hydrogen, lower alkyl, halogen, monocyclic aryl, nitro and amino, R" is a member of the group consisting of lower alkyl and monocyclic aryl, and R' and R" when taken together form a member of the group consisting of trimethylene and tetramethylene and X is a member of the group consisting of hydroxy, halogen and hydrazino.

2. A compound of the formula:

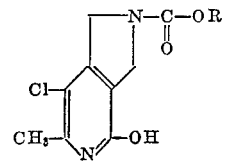

wherein R is lower alkyl.

3. A compound of the formula:

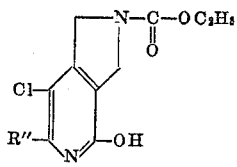

wherein R" is lower alkyl.

4. The compound ethyl 1,3-dihydro-4-hydroxy-6-methyl-2H-pyrrolo[3,4-c]pyridine-2-carboxylate.

5. The compound ethyl 7-chloro-1,3-dihydro-4-hydroxy - 6 - methyl - 2H - pyrrolo[3,4-c]pyridine - 2-carboxylate.

6. The compound ethyl 1,3-dihydro-4-hydroxy-6-methyl - 7 - nitro - 2H - pyrrolo[3,4-c]pyridine - 2-carboxylate.

7. The compound ethyl 7-amino-1,3-dihydro-4-hydroxy - 6 - methyl - 2H - pyrrolo[3,4-c]pyridine - 2-carboxylate.

8. The compound ethyl 4-chloro-1,3-dihydro-6-methyl-7-nitro-2H-pyrrolo[3,4-c]pyridine-2-carboxylate.

9. The compound ethyl 7-amino-4-chloro-1,3-dihydro-2H-pyrrolo[3,4-c]pyridine-2-carboxylate.

10. The compound ethyl 4,7-dichloro-1,3-dihydro-6-methyl-2H-pyrrolo[3,4-c]pyridine-2-carboxylate.

11. The compound ethyl 7-chloro-4-hydrazino-1,3-dihydro - 6 - methyl - 2H - pyrrolo[3,4-c]pyridine - 2 - carboxylate.

12. The compound ethyl 4-hydrazino-1,3-dihydro-6-methyl - 7 - nitro - 2H - pyrrolo[3,4-c]pyridine - 2-carboxylate.

13. The process of preparing a compound of the formula:

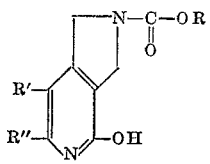

in which R is a member of the group consisting of lower alkyl and monocyclic aryl, R' is a member of the group consisting of hydrogen, lower alkyl, halogen, monocyclic aryl, nitro and amino, R" is a member of the group consisting of lower alkyl and monocyclic aryl and R' and R" when taken together form a member of the group consisting of trimethylene and tetramethylene which comprises heating approximately one part by weight of a compound of the group consisting of the anhydrous, hydrated and sodio derivatives of a compound of the formula:

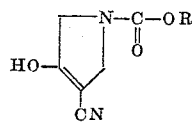

in which R is as defined above, in about 5 to 11 parts by weight of polyphosphoric acid in the presence of 0 to 10 parts by weight of a solvent of the group consisting of water and lower alkanols with at least stoichiometric quantities of a compound of the formula:

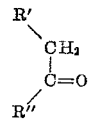

wherein R' and R" are as defined above and isolating the said product therefrom.

14. The process in accordance with claim 13 wherein 1-carbethoxy-4-cyano-3-pyrrolidone and chloroacetone are the reactants.

15. The process in accordance with claim 13 wherein 1-carbethoxy-4-cyano-3-pyrrolidone and acetone are the reactants.

16. The process in accordance with claim 13 wherein 1-carbethoxy-4-cyano-3-pyrrolidone and acetophenone are the reactants.

References Cited in the file of this patent
UNITED STATES PATENTS 2,767,191    Wright _____ Oct. 16, 1956

OTHER REFERENCES

Wright et al.: J. Am. Chem. Soc., vol. 79, pages 2199–2203 (1957).

UNITED STATES PATENT OFFICE
CERTIFICATE OF CORRECTION

Patent No. 3,024,243                                  March 6, 1962

John Song et al.

It is hereby certified that error appears in the above numbered patent requiring correction and that the said Letters Patent should read as corrected below.

Columns 3 and 4, Table I, footnote 8 thereof, for "5" read -- 6 --; column 5, line 52, for "of" read -- by --; column 8, line 57, for "water. The mixture is heated at 90° to 95° C. (20 min-" read -- wherein R is a member of the group consisting of lower --.

Signed and sealed this 26th day of June 1962.

(SEAL)
Attest:

ERNEST W. SWIDER                                  DAVID L. LADD
Attesting Officer                                       Commissioner of Patents